United States Patent
Angelery

[11] 3,756,283
[45] Sept. 4, 1973

[54] FLUID DYNAMICALLY BALANCED VALVE

[76] Inventor: Henry W. Angelery, 19 Gwynne Ct., Closter, N.J. 07624

[22] Filed: Aug. 30, 1971

[21] Appl. No.: 175,943

[52] U.S. Cl......... 137/630.15, 137/630.19, 251/282
[51] Int. Cl............................................ E03b 11/00
[58] Field of Search................... 137/630.15, 630.19; 251/38, 120, 126, 282

[56] References Cited
UNITED STATES PATENTS
| | | | |
|---|---|---|---|
| 3,213,887 | 10/1965 | Angelery........................ | 137/630.15 |
| 2,966,167 | 12/1960 | Jensen........................... | 137/630.19 |

Primary Examiner—Robert G. Nilson
Assistant Examiner—Edward Look
Attorney—Granville M. Brumbaugh et al.

[57] ABSTRACT

The housing of a reduction valve includes an input chamber, an output chamber, and a main valve seat located therebetween which is engaged, when the valve is closed, by a main piston. The interior of the main piston defines a control chamber into which fluid from the input chamber can flow at a limited but substantial rate. An inner valve seat is formed in the top of the main piston which defines an opening leading from the control chamber to the output chamber. An inner piston is adapted to engage the inner valve seat, thus sealing the control chamber against the output chamber when the valve is closed. A lower chamber into which fluid can flow freely from the input chamber is located beneath the control chamber. A vane structure atop the main piston provides an upward force in response to fluid flow across the main valve seat.

7 Claims, 2 Drawing Figures

INVENTOR.
HENRY W. ANGELERY

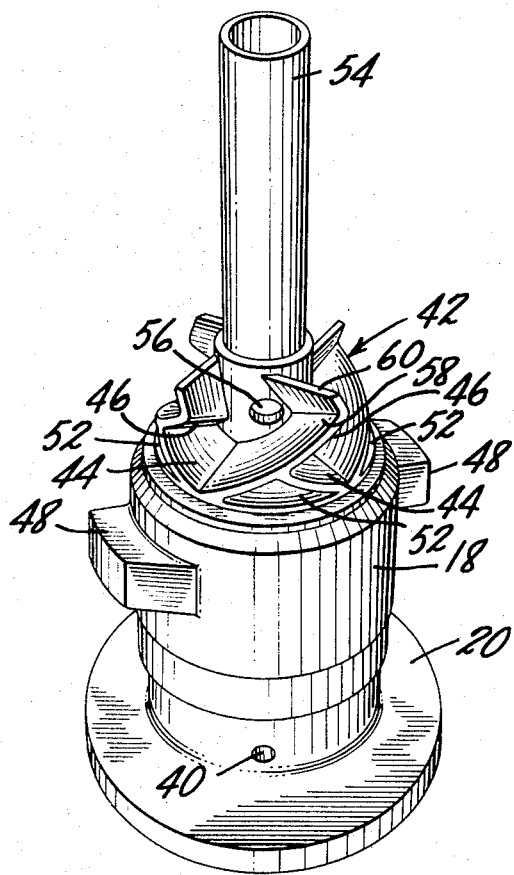

FLUID DYNAMICALLY BALANCED VALVE

BACKGROUND OF THE INVENTION

This invention relates to a new and improved reduction valve, and, more particularly, a reduction valve in which fluid dynamic forces balance the force of the control mechanism which opens and closes the valve.

In a conventional reduction valve, a piston is urged against the valve seat by a coil spring and a control means urges the piston away from the seat to open the valve. Thus, as the piston is depressed the force needed to balance the spring force is modulated as a substantially linear function of the spring rate. A difficult problem long associated with this type of construction arises because, as the piston first begins its travel away from the valve seat, the rate at which fluid flows through the valve is very large in relation to the displacement of the piston. Moreover, because small initial changes in the position of the piston produce large changes in the rate of flow, a conventional coil spring has a tendency to oscillate when the valve operates near its closed position. This not only leads to noisy, unstable operation but causes excessive wear and may result in damage to the valve seat and the piston. The tendency to oscillate is conventionally overcome by increasing the spring rate, thus necessitating an undesirably large and heavy spring. As the spring rate is increased, the force required to open the valve is, of course, increased. This becomes burdensome because of the large force needed to fully open the valve.

In my earlier U.S. Pat. No. 2,805,039 issued on Sept. 3, 1957, I disclosed an improved valve having an inner piston disposed within the main piston utilizing pressure differences to modulate the balancing forces acting on the main piston. Although this was an improvement over earlier valves, it did not eliminate the need for a relatively heavy spring having a high spring rate to bias the main piston toward a closed position. Instability was reduced but was still a problem. A later developed valve, which I invented, employs a plurality of vanes attached to the top of the main piston which interact with the fluid that flows across the main valve seat to exert a force on the main piston urging it toward a closed position. Like the valve disclosed in the patent mentioned above, this later valve employs a control chamber which can be sealed by the inner piston and a lower chamber located beneath the inner piston that is sealed against the high pressure side, i.e., the input chamber. Although this arrangement embodies some improvements with respect to my earlier, patented valve, it does not take full advantage of the forces that can be generated from the pressure and flow of the fluid to provide the necessary balancing of control forces. Thus, there is a need for a better, more stable valve with a wide operating range that is capable of smooth operation in a near-closed position.

SUMMARY OF THE INVENTION

The valve disclosed here is a further improvement upon my earlier valves, discussed above, which makes greater use of the pressure and flow of the fluid and eliminates the need for a heavy spring to balance the force of the control mechanism. It comprises a housing including an input chamber, an output chamber, and a main valve seat disposed between the input and output chambers. A main piston is adapted to engage the main valve seat when the valve is closed. A vane means for urging the main piston toward the main valve seat in response to the flow of fluid into the output chamber is attached to the top of the main piston. A control chamber is disposed beneath the top of the main piston, and an inner valve seat is formed in the top of the main piston defining an opening which connects the control chamber to the output chamber. An inner piston is provided which is engageable with the inner valve seat. A lower chamber into which fluid can flow freely from the input chamber is disposed beneath the inner piston.

In the preferred embodiment, the valve further comprises a base member that projects upwardly into the main piston, the clearance between the base and the main piston being such that fluid can flow through this clearance at a limited but substantial rate. The vane means may comprise a plurality of inclined surfaces, which define open cavities, against which the fluid acts by impact and aspiration to urge the main piston against the main valve seat.

The valve also includes a plurality of pitot tubes located below the vane means through which fluid can flow to oppose the flow of fluid from the control chamber into the output chamber and to raise the pressure in the control chamber. A control means of the automatically or the manually operated type is provided to open and close the valve. Preferably, this control means includes a stem having an inner portion which engages the inner piston and an outer piston which engages the main piston after the inner piston has been displaced through a predetermined distance

BRIEF DESCRIPTION OF THE DRAWINGS

For a complete description of the present invention reference may be had to the detailed description which follows and to the accompanying drawings in which:

FIG. 2 is a three-dimensional pictorial view of a portion of the valve of FIG. 1.

DESCRIPTION OF THE PREFERRED EMBODIMENT

Figure 1:
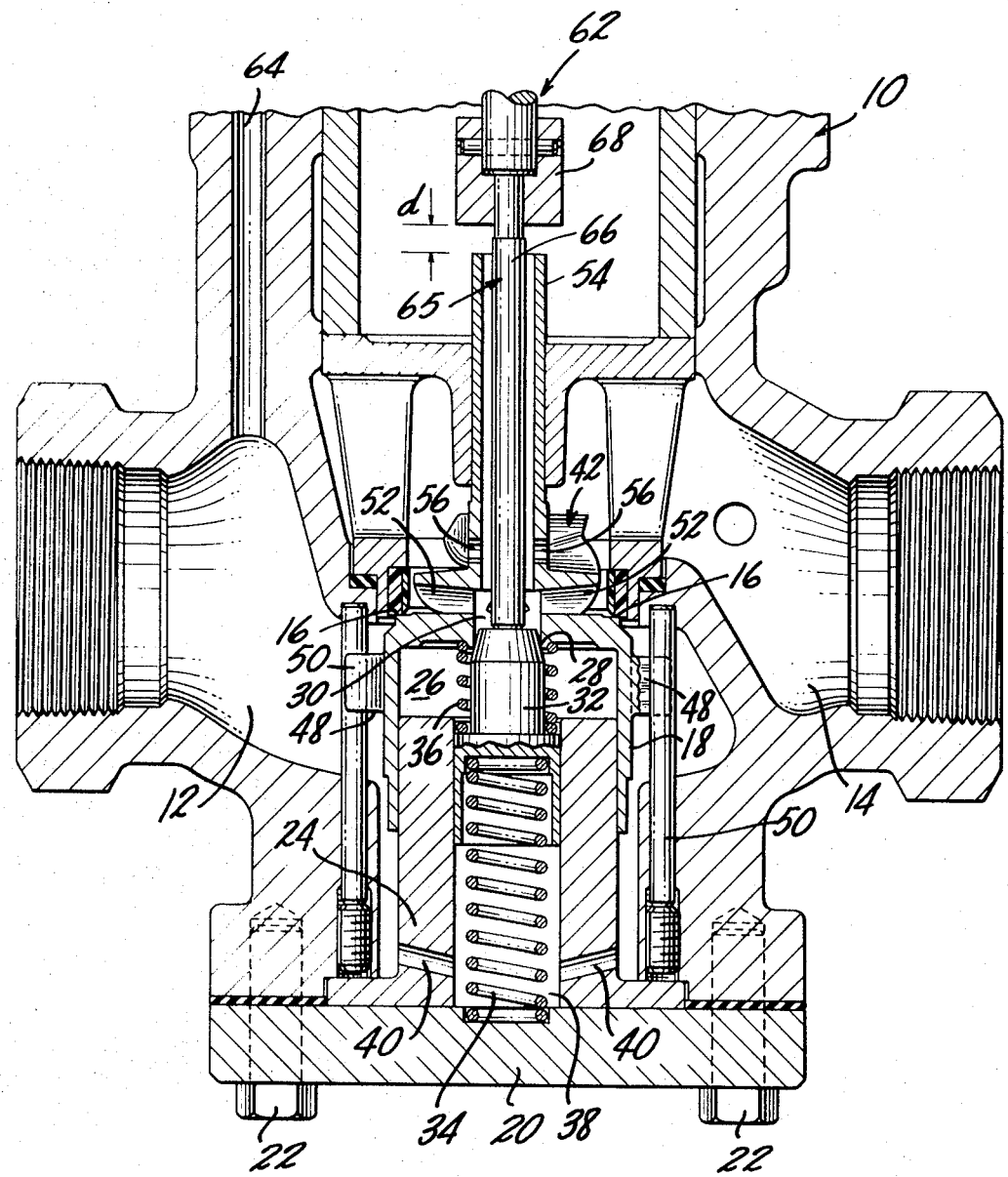
FIG. 1 is a cross-sectional side view of a valve constructed in accordance with the invention.

A valve constructed in accordance with the invention comprises a housing 10 including an input chamber 12, an output chamber 14, and a valve seat 16 disposed between the input chamber 12 and the output chamber 14. A main piston 18 is adapted to engage the valve seat 16 when it moves upwardly to the fullest extent of its travel.

A base 20 is attached to the housing by bolts 22. A portion 24 of the base 20 projects upwardly into the main piston 18. A control chamber 26 is disposed beneath the top of the main piston 18 and is bounded on the sides by the walls of the main piston 18 and on the bottom by the base 20. The clearance between the upwardly projecting portion 24 of the base 20 and the walls of the piston 18 is such that fluid from the input camber 12 can flow into the control chamber 26 at a limited but substantial rate. Although the precise dimensions of these parts is not critical, it is important that fluid flow through this clearance to pressurize the control chamber 26 and that the flow be limited so that the control chamber 26 is not pressurized instantaneously.

A valve seat 28 is formed in the top of the piston 18 which defines an opening 30 connecting the control chamber 26 to the output chamber 14. An inner piston 32 is adapted to engage the inner valve seat 28 and is journaled for reciprocation within the base 20. The inner piston 32 is urged against the inner valve seat 28 by a main coil spring 34. This spring 34 need only support the weight of the inner piston 32 and the main piston 18. It does not have a high spring rate and does not provide the balancing force to modulate the opening and closing action of the valve. In fact, if the valve is to be mounted upside-down, this spring 34 may be omitted. A second spring 36 is provided within the control chamber 26 to partially counter-balance the force of the main spring 34 and to insure a smooth and positive reciprocating action by the main piston 18.

A lower chamber 38 defined by the base 20 and the bottom of the inner piston 32 is disposed beneath the control chamber 26. (When using words such as beneath, top, and bottom, to indicate the relative position of parts, it is assumed, for convenience in describing the apparatus, that it is oriented as shown in FIG. 1.) A plurality of ducts 40 are formed in the base 20 to permit free flow of fluid between the lower chamber 38 and the input chamber 12. The structure defining the lower chamber 38 could be other than that which is preferred and shown in FIG. 1. It could, in fact, be an extension of the input chamber 12. What is important is that the inner piston 32 moves downwardly against the high-side pressure.

A vane means 42 is attached to the top of the main piston 18. The function of this vane means 42 is to urge the main piston 18 toward the main valve seat 16 in response to the flow of fluid across the main valve seat 16 into the output chamber 14. The vane means 42 may be seen most clearly in FIG 2. It includes a plurality of oppositely inclined surfaces 44 and 46 that define open cavities within which the fluid acts by impact and aspiration to urge the main piston 18 upwardly. This upward force is, of course, a function of the rate of fluid flow. The vane means 42 produces a rotational force as well as an upward force, and the main piston 18 is, therefore, provided with two wing-like projections 48 that are engaged by a pair of anti-rotation pins 50 attached to the housing 10.

A plurality of triangular-shaped pitot tubes 52 are disposed beneath the vane means 42 connecting the portion of the output chamber 14 which surrounds the vane means 42 to the opening 30 in the top of the main piston 18. The vane means 42 is formed about a cylindrical tube 54 that extends upwardly from the main piston 18. A plurality of exhaust ports 56 are formed in this tube 54 near the top of the vane means 42. As can best be seen in FIG. 2, additional inclined surfaces 58 and 60 are provided to interact with fluid flowing out of the tube 54 through the ports 56, thus increasing the upward force on the piston 18. The additional surfaces 58 and 60 also interact with a portion of the fluid which by-passes the pitot tubes 52 and create a counter-rotational force. In the preferred embodiment, the vane means 42 and the tube 54 are integrally formed with the main piston 18, and the cross-sectional area of the ports 56 is about one-third that of the pitot tubes 52.

A control means 62 of the type conventionally used for opening and closing reduction valves is mounted atop the housing 10. This control means 62 may be manually operable or it may be of the automatically operated type, an example of which is disclosed in my earlier U.S. Pat. No. 2,805,039. A conduit 64 is provided in the housing 10 through which fluid may be supplied to operate an automatic control means.

The control means 62 includes a stem 65 having an elongated inner portion 66 which extends through tube 54 and engages the inner piston 32. The stem 65 also carries an outer portion 68 of larger diameter which engages the main piston 18 via the tube 54 after the inner piston 32 has been displaced downwardly through a predetermined distance $d$.

The operation of the valve will now be explained. The valve is opened in three stages. Assuming that it is completely closed (as shown in FIG. 1) when the control means 62 is actuated, the inner portion 66 of the stem 65 presses down on the top of the inner piston 32 moving it away from the inner valve seat 28. The control means 62 does not, at this time, act on the main piston 18 because the outer portion 68 is not in contact with the tube 54. The pressure in the control chamber is, when the valve is closed, equal to the high-side pressure of the input chamber 12, assuming that the valve has been closed long enough for sufficient fluid to flow through the clearance between the walls of the piston 18 and the base 20. The output chamber 14 is, of course, at a relatively low pressure. The lower chamber 38 is always at the same high-side pressure as the input chamber 12 because the ducts 40 permit free flow of fluid from the input chamber 12.

As the inner piston 32 moves away from the inner valve seat 18, fluid from the control chamber 26 flows through the opening 30 into the tube 54 and out through the ports 56 into the output chamber 14, thus reducing the pressure in the control chamber 26. As this pressure decreases, it requires a larger force to move the inner piston 32 against the high pressure of the lower chamber 38. The pressure in the control chamber 26 continues to decrease, approaching the pressure in the output chamber 14 as a lower limit.

The second stage of operation begins when the inner piston 32 has been displaced downwardly through the predetermined distance $d$ and the outer portion 68 of the control means stem 65 engages the tube 54 forcing the main piston 18 away from the main valve seat 16. A portion of the fluid that flows across the main valve seat 16 enters the pitot tubes 52. The remainder of this fluid passes the pitot tubes 52 and interacts with the vane means 42, primarily with the inclined surfaces 44 and 46, creating an upward thrust on the main piston 18, thus providing an increasing balancing force opposing the action of the control means 62.

The fluid which passes through the pitot tubes 52 opposes the flow of fluid from the control chamber 26 into the tube 54 through the opening 30. Fluid from the input chamber 12 continues to flow through the clearance between the base 20 and the walls of the piston 18 into the control chamber 26 again building up the pressure therein. In addition, part of the fluid flowing through the pitot tubes 52 may enter directly into the control chamber 26 further contributing to pressure buildup. Thus, the balancing force opposing the action of the control means 62 is supplied by increasing pressure in the control chamber 26 and by the lifting force of the vane means 42.

As the main piston 18 descends, the control chamber pressure approaches the high-side pressure of the input chamber 12, and the increase in control chamber pressure begins to level off. The valve thus enters its third phase of operation in which the increase in the force opposing the control means 62 is supplied solely by the vane means 42 as result of the increasing rate of fluid flow. The portion of the fluid flowing across the main valve seat 16 that enters the pitot tubes 52 flows up through the tube 54 and out through the ports 56 to interact with the upper surfaces 58 and 60 of the vane means 42. Accordingly, the effect of this fluid is not lost.

In the manner described above, a properly modulated balancing force is applied in opposition to the control means 62 enabling the valve to operate smoothly over a wide range. The valve does not have the tendency to oscillate when operating in a near-closed position which characterizes conventional valves in which the balancing force is supplied by a spring. The balancing force increases as the extent to which the valve is opened increases, thus simulating the desirable properties of a spring.

It will be obvious to those skilled in the art that the embodiment described above is meant to be merely exemplary and that the specific structure of the valve is susceptible of modification and variation without departing from the spirit and scope of the invention. Therefore, the invention is not deemed to be limited except as defined by the appended claims.

I claim:

1. A reduction valve comprising a housing including an input chamber, an output chamber, and a main valve seat disposed therebetween, a main piston adapted to engage the main valve seat when the valve is closed, a vane means for urging the main piston toward the main valve seat in response to the flow of fluid across the main valve seat into the output chamber, a control chamber disposed beneath the top of the main piston, an inner valve seat formed in the top of the main piston which defines an opening connecting the control chamber to the output chamber, an inner piston engageable with the inner valve seat, a lower chamber located beneath the inner piston into which fluid can flow freely from the input chamber, and a base that projects into the main piston, the clearance between the base and the main piston being such that fluid can flow through this clearance at a limited but substantial rate, whereby the pressure and flow of fluid is utilized to provide the forces that balance the valve.

2. The valve of claim 1 further comprising a base that projects into the main piston and defines the sides of the lower chamber.

3. The valve of claim 2 wherein the lower chamber is defined by the base and the bottom of the inner piston.

4. The valve of claim 1 wherein the vane means comprises a plurality of inclined surfaces against which the fluid acts by impact and aspiration.

5. The valve of claim 1 wherein the vane means comprises a plurality of inclined surfaces that define open cavities within which the fluid acts to urge the main piston against the main valve seat.

6. The valve of claim 1 further comprising at least one pitot tube located below the vane means through which fluid can flow to oppose the flow of fluid from the control chamber into the output chamber and to raise the pressure in the control chamber.

7. The valve of claim 1 further comprising a control means for opening and closing the valve including a stem having an inner portion which engages the inner piston and an outer portion which engages the main piston after the inner piston has been displaced through a predetermined distance.

* * * * *